United States Patent [19]

Sanner et al.

[11] Patent Number: 5,442,992
[45] Date of Patent: Aug. 22, 1995

[54] HYDRAULIC CONTROL APPARATUS WITH SELECTIVELY OPERATED CHECK VALVE ASSEMBLY

[75] Inventors: Lanny R. Sanner; Scott Elsasser, both of Fairmont, Minn.

[73] Assignee: Greenlee Textron Inc., Rockford, Ill.

[21] Appl. No.: 110,085

[22] Filed: Aug. 20, 1993

[51] Int. Cl.$^6$ .................. F15B 11/08; F15B 13/04; F01B 31/00

[52] U.S. Cl. ...................... 91/428; 91/437; 92/163

[58] Field of Search .............. 91/428, 430, 437; 92/49, 51, 163

[56] References Cited

U.S. PATENT DOCUMENTS

| | | | |
|---|---|---|---|
| 3,882,883 | 5/1975 | Droegemueller | 137/270 |
| 4,366,673 | 1/1983 | Lapp | 60/477 |
| 4,548,229 | 10/1985 | Johnson | 137/270 |
| 4,589,437 | 5/1986 | Zeuner et al. | 137/625.63 X |

*Primary Examiner*—John E. Ryznic
*Attorney, Agent, or Firm*—Trexler, Bushnell, Giangiorgi & Blackstone, Ltd.

[57] ABSTRACT

A hydraulic control apparatus for use with a hydraulically operated tool comprises a valve body operatively and having a valve bore defining an axis. The valve body also defines a pressure port and a return port for connecting the valve bore to a source of hydraulic fluid, and a cross port communicating between the valve bore and the hydraulic tool. A tubular conduit has one end in communication with the valve bore and an opposite end in communication with the hydraulic tool. A selector member is moveable between a first position for defining a passage communicating between the cross port and the opposite end of the tubular conduit to provide a return path for hydraulic fluid between the pressure port and the return port, and a second position for closing off this passage.

12 Claims, 5 Drawing Sheets

HYDRAULIC CONTROL APPARATUS WITH SELECTIVELY OPERATED CHECK VALVE ASSEMBLY

BACKGROUND OF THE INVENTION

This invention is directed generally to a control system for operating a hydraulically driven tool. More particularly, the invention is directed to a novel control valve arrangement for such a tool which may be used in both constant pressure and constant volume hydraulic fluid systems without requiring the disassembly or replacement of any parts in the valve or in the hydraulically driven tool.

Generally speaking, two basic types of hydraulic systems are used as the power source for hydraulically operated tools, namely, the constant volume system and the constant pressure system. In the constant volume system, in the off or neutral position, the hydraulic oil or other fluid must be free to flow back to the power or source. Accordingly, the on-off hydraulic control valves for use with such a system have heretofore employed a so-called open center spool so that when the valve is in its off or neutral position the fluid is free to flow through the valve and back to the source. In the constant pressure system, the hydraulic pump operates only intermittently to achieve and maintain a desired pressure. Accordingly, with a constant pressure system, the on-off control valve has heretofore employed a so-called closed center spool so that in the off or neutral position the flow of fluid is blocked to maintain the desired system pressure.

Hydraulically driven tools are used in many applications in the field, for example, by utility companies, municipalities, park districts, and the like. In particular, such tools are utilized in arbor or foliage management and hence, such tools are often utilized for example, by tree management companies, orchards, and the like as well. While the present invention is directed to a tree pruner type of tool, it will be appreciated that the invention may find application in other sorts of hydraulically operated tools.

Many of the foregoing users of such tools frequently employ both constant pressure type and constant volume type hydraulic power sources. That is, various equipment such as trucks and the like utilized in the field may be equipped with one or the other of these types of hydraulic power sources or systems. Accordingly, many of the users of such tools have heretofore found it necessary or desirable to maintain duplicate sets of tools in order to operate with either type of system. For example, if in the field only hydraulic tools for operation with one of these two types of systems were available, workers would be required to return to the shop if by chance the hydraulic power system provided or employed in the field was not of the same type as the tools which had been provided.

While providing duplicate sets of tools overcomes this difficulty, this represents quite an increase in capital costs, storage costs and the like. Employing and maintaining duplicate sets of tools also takes up much needed space on trucks or other equipment-carrying vehicles or the like.

One possible solution would be to design tools with interchangeable valve spools, one with an open center and one with a closed center. The operator could then select and install the proper spool to match the hydraulic power source. However, this would require that duplicate spools be available for use with each tool, again requiring additional inventory and storage costs and space requirements. Moreover, it would require the Operator have sufficient skills to properly disassemble and reassemble the valves with each of the tools to be used. This again requires some additional time at the job site for disassembly and reassembly of the valves of various tools as may be necessary. The frequent removal and replacement of valve tools would also unnecessarily disturb the hydraulic system and seals and the like and provide increased opportunities for dirt, debris and the like to be introduced into the hydraulic system. As a related matter, the spools which were removed from the tools and not in use would be left unprotected and subject to damage, loss, contamination, and the like.

The prior art has proposed two solutions to the foregoing problems in the form of valve assemblies which were designed to work in either a normally closed or normally open position. U.S. Pat. No. 3,882,883 discloses a valve assembly having a spool which may be rotated 180° to shift from a normally open operating mode to a normally closed operating mode. However, this valve design requires that a linkage rod be removed before the spool may be rotated. Thus, there is still the possibility of the linkage rod being improperly removed and reassembled, lost, damaged, contaminated or the like.

In U.S. Pat. No. 4,548,229 a valve assembly for accommodating both open center and closed center modes of operation is disclosed for use with an impact wrench. However, this valve assembly is suitable only for use with rotating tools, because the valve assembly itself is designed to shunt hydraulic fluid back to the source when the tool is in the off or neutral state, in the open center mode of operation. This tool is provided with a specially designed valve cylinder or sleeve which surrounds the valve spool. The sleeve is configured for open center operation when in a first orientation and for closed center operation when it is rotated to a second orientation approximately 180° of rotation from its first orientation. This valve is designed to permit constant flow of hydraulic fluid through the tool when the valve is in its on position in both open center and closed center modes of operation. The valve is designed to cut off the hydraulic fluid flow at the valve itself in the closed center mode of operation when the valve is in its closed or neutral position. Conversely, this valve is designed to direct flow through the valve itself and back to the source when in the off or neutral position in its open center mode of operation.

That is, in U.S. Pat. No. 4,548,229, in both open center and closed center modes, when the valve is in its off or neutral position, the valve does not permit flow of fluid past the valve and there is no fluid flow to the tool. However, such a valve arrangement will not work with a reciprocating type of hydraulic power tool wherein it is necessary to alternately direct flow to opposite sides of a reciprocating piston. The tree pruner or lopper device disclosed in connection with the present invention is one such type of tool which utilizes a reciprocating piston, rather than a rotating rotor as utilized in tools such as the impact wrench of the above-mentioned U.S. Pat. No. 4,548,229.

OBJECTS AND SUMMARY OF THE INVENTION

Accordingly, it is an object of the invention to provide a novel and improved hydraulic fluid flow control system for use with a reciprocating tool, which control system may be converted from a normally open system to a normally closed system and vice-versa, without the disassembly or removal of any parts.

A related object of the invention is to provide a hydraulic control system which may be quickly and easily changed for operation with either a constant volume system or a constant pressure system as the power source without any special tools or skills and without disassembly or removal of any parts.

Briefly, and in accordance with the foregoing objects, a hydraulic control apparatus for use with a hydraulically operated tool comprises a valve body operatively coupled to said hydraulically operated tool and having a valve bore defining an axis, said valve body also defining a pressure port and a return port for connecting said valve bore to a source of hydraulic fluid, and a cross port communicating between said valve bore and said hydraulic tool; a tubular conduit having one end in communication with said valve bore and an opposite end in communication with said hydraulic tool and a selector member moveable between a first position for defining a passage communicating between said cross port and said opposite end of said tubular conduit to provide a return path for hydraulic fluid between said pressure port and said return port, and a second position for closing off said passage.

BRIEF DESCRIPTION OF THE DRAWINGS

The features of the present invention which are believed to be novel are set forth with particularity in the appended claims. The organization and manner of operation of the invention, together with further objects and advantages thereof may best be understood by reference to the following description, taken in connection with the accompanying drawings in which like reference numerals identify like elements, and in which:

DETAILED DESCRIPTION OF THE ILLUSTRATED EMBODIMENT

Referring now to the drawings, and initially to FIGS. 1-4, the invention will be described with reference to a reciprocating hydraulically operated tool. In the illustrated embodiment, this tool takes the form of a long reach shade tree pruner 20. As best viewed FIG. 2, the tool 20 comprises a handle portion 22 which houses a hydraulic control apparatus or system for operating the tool, and a working portion 24 which in the illustrated embodiment comprises scissors-like pruning shears or blades 26, 28. In FIG. 2, the blades 26, 28 are shown in a closed position. A suitable linkage assembly designated generally by reference numeral 30 operatively couples the blade 26 which is moveable for opening and closing relative to the blade 28 which remains fixed. An elongate linkage 32 couples the linkage assembly 30 to a reciprocating piston 34 housed in the handle or control portion 22 of the tool 20. The linkage 32 preferably comprises one or more elongate members which are slidably moveable within a housing or sheath 36 to impart the reciprocal motion of the piston 34 to the linkage assembly 30 for opening and closing the blade 26 relative to the blade 28. It should be recognized that the hydraulic control apparatus of the invention may be used with reciprocating tools of other types without departing from the invention.

Figure 1:
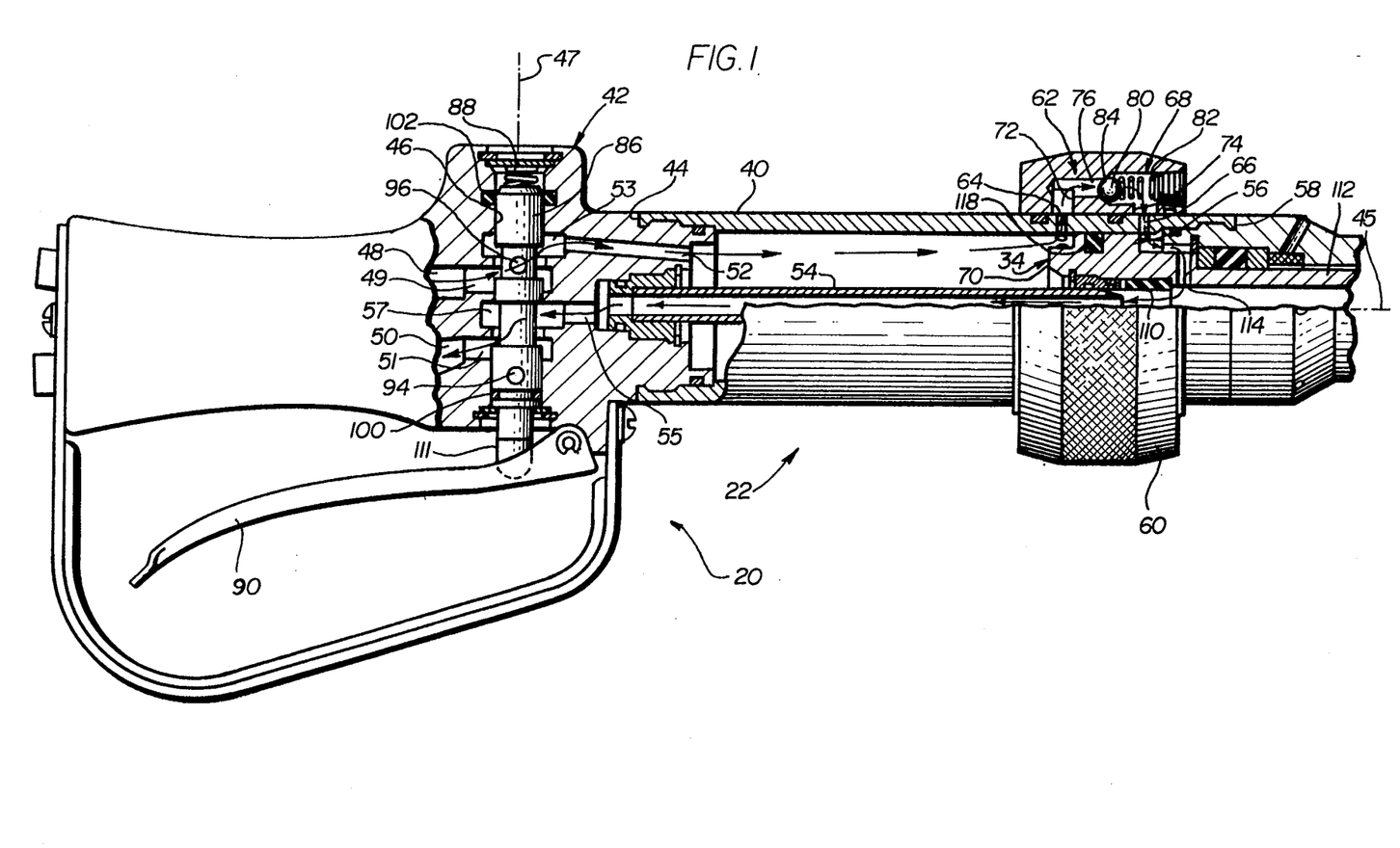
FIG. 1 is a partial view, partially broken away of a control portion of a hydraulic, reciprocating tool in accordance with the invention, in an open center configuration and an off position.
Figure 2:
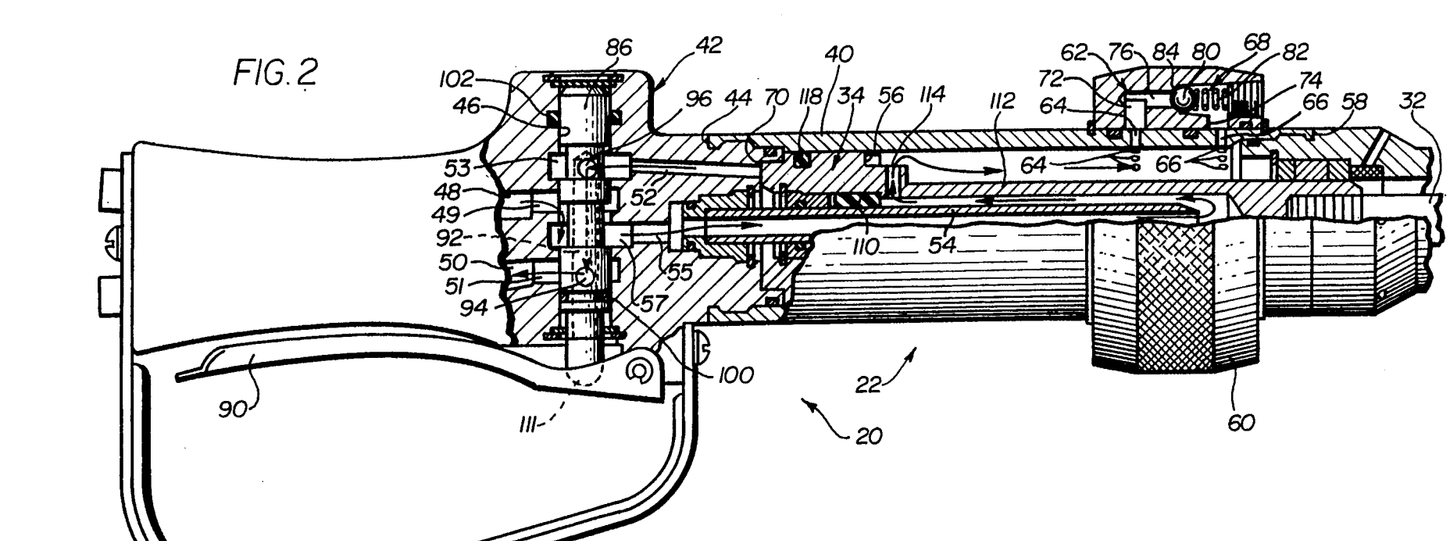
FIG. 2 is a view similar to FIG. 1 showing the tool in an 'on' position.
Figure 2A:
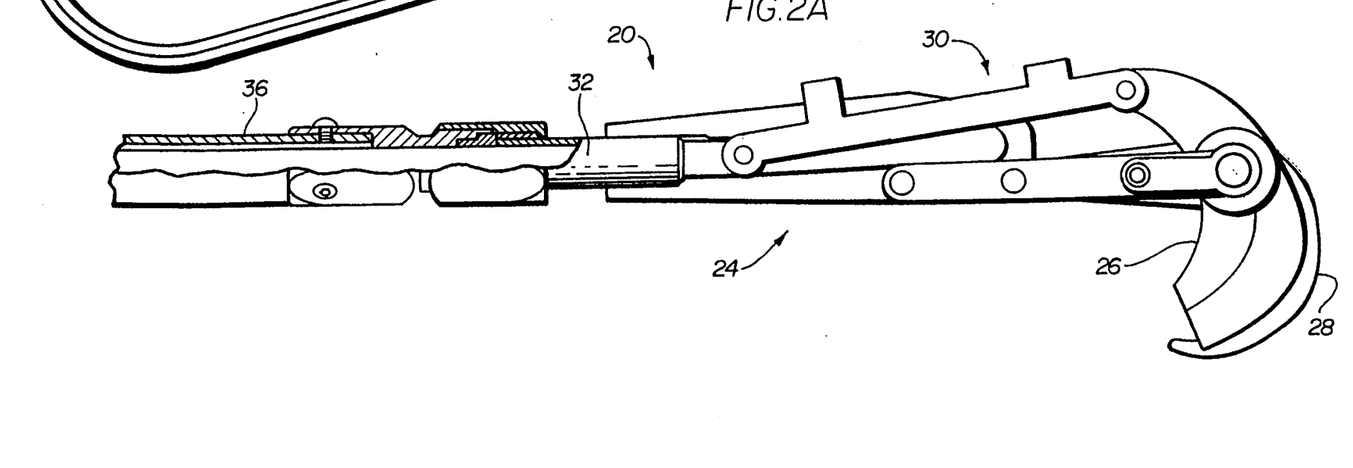
FIG. 2A shows a portion of a pruning tool which may be operated by the system of the invention.

Referring now to FIG. 1, the hydraulic control apparatus of the invention comprises an elongated cylinder 40, the piston 34 being mounted for reciprocal motion between opposite ends of the cylinder 40. A valve body 42 is operatively coupled to one end 44 of the cylinder 40. This valve body 42 has a valve bore 46 which defines an axis 47 which is generally perpendicular to a longitudinal axis 45 of the cylinder 40. The valve body also defines a pressure port 48 and a return port 50 for connecting the valve bore 46 to a source of hydraulic fluid, and a cross port 52 which communicates between the valve bore 46 and the interior of the elongated cylinder 40.

In accordance with an important feature of the invention, the source of hydraulic fluid or power source may be either a constant volume system or a constant pressure system. As will be more fully described later herein, the hydraulic control apparatus or system 22 includes a selector member 60 which is capable of adapting the tool for operation with either a constant volume system or a constant pressure system.

An elongated tubular conduit 54 has one end in communication with the valve bore 46 by way of a short port 55 and an opposite end in communication with an opposite side 56 of the piston 34, that is, the side thereof which faces opposite the end 44 of the cylinder at which the valve body 42 is coupled. That is, the side 56 of piston generally faces an opposite end 58 of the cylinder 40. The valve-bore 46 has four, axially spaced, enlarged diameter portions 49, 51, 53 and 57 with which the respective ports 48, 50, 52 and 55 communicate.

Figure 3:
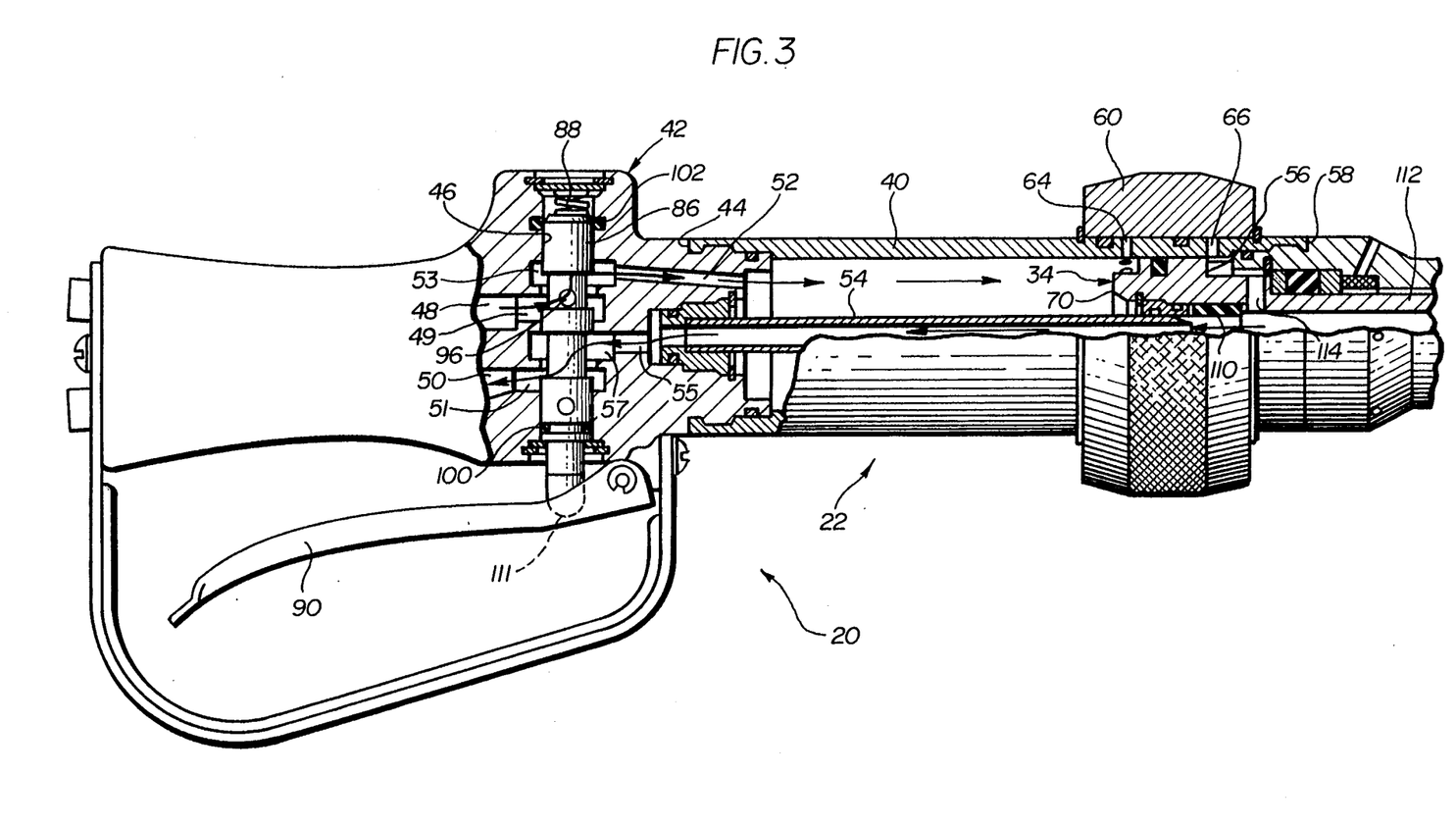
FIG. 3 is a view similar to FIG. 1 showing the system of the invention in a closed center configuration and an off position.

The selector member 60 is moveable between a first position as shown in FIGS. 1 and 2 for a so-called open center mode of operation, that is, for operating with a constant volume system as the hydraulic power source. In a second position of the selector 60 is illustrated in FIGS. 3 and 4, the tool is adapted to operate in a so-called closed center mode, that is, with a constant pressure system as the hydraulic power source.

Figure 7:
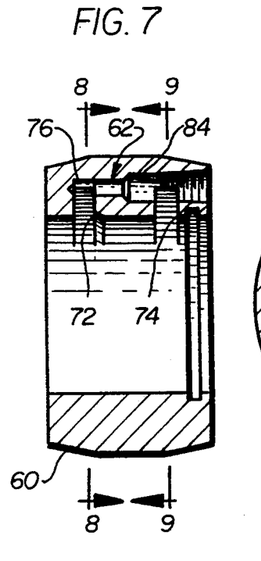
FIG. 7 is a sectional view of a rotatable control member of the invention.
Figure 8:
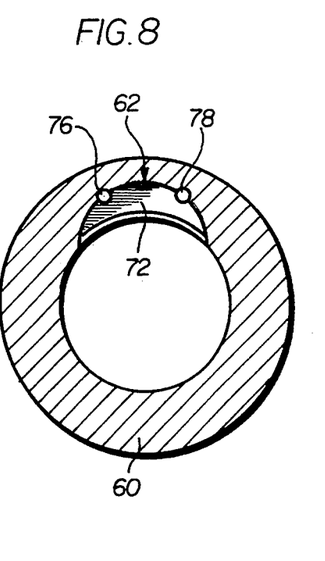
FIG. 8 is a sectional view taken generally in the plane of the line 8—8 of FIG. 7.
Figure 9:
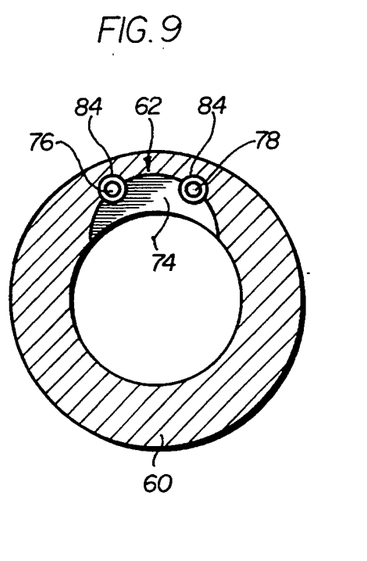
FIG. 9 is a sectional view taken generally in the plane of the line 9—9 of FIG. 7.
Figure 10:
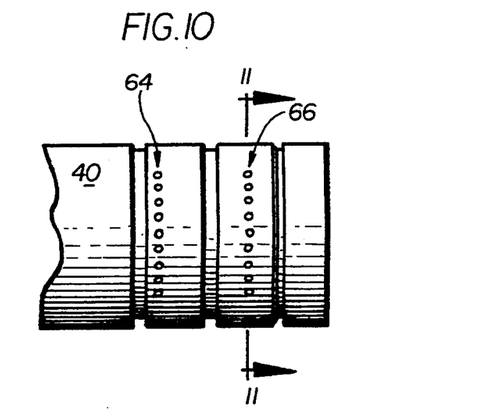
FIG. 10 is a partial plan view of a cylinder portion of the system of the invention.
Figure 11:
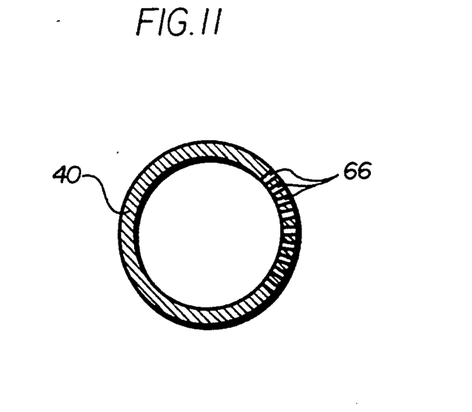
FIG. 11 is a sectional view taken generally in the plane of the line 11—11 of FIG. 10.

In the first position as illustrated in FIGS. 1 and 2, the selector member 60 defines a passage 62 which communicates between opposite sides of the piston 34 when the piston is in its fully advanced position with respect to the cylinder 40, as illustrated in FIG. 1. In this fully advanced position, the piston is fully advanced with respect to the end 58 of the cylinder which is opposite its end 44 at which the valve body 42 is coupled. In the second position of the selector 60 as illustrated in FIGS. 3 and 4, this passage 62 is rotated out of a position for communicating between the opposite sides of the piston 34 in this manner. In this regard, and referring also to FIGS. 7-9, it will be seen that the selector 60 comprises a generally annular member or sleeve which is rotatably mounted to an external surface of the cylinder 40. Cooperatively, and as also shown in FIGS. 10 and 11, the cylinder 40 has at least one pair of through openings 64 and 66 which are respectively located to either side of the piston 34 when in the fully advanced position illustrated in FIG. 1. These through openings 64 and 66 communicate with the passage 62, such that the passage 62 interconnects the openings 64 and 66 and thus permits communication between opposite sides of the piston 34 when in the fully advanced position as shown in FIG. 1. Additionally, the passage 62 mounts a one-way check valve 68 which limits fluid flow to a single direction, namely, from a side 70 of the piston 34 which faces the first end 44 of the cylinder and the opposite side 56 of the piston which faces the opposite end 58 of the cylinder 40.

Further details of the construction of the selector 60 and of the cooperating end portion of the cylinder 40 are illustrated in FIGS. 7-11, to which further reference now is invited. In this regard, it will be seen that the through openings 64 and 66 each comprise a plurality of similar through openings which are circumferentially spaced about an approximately 90° arc along an external wall of the cylinder 40. The passage 62 will be seen to include a pair of spaced apart arcuately shaped entrance portions 72, 74 which communicate respectively with the circumferentially spaced sets of through openings 64 and 66. Communicating between the entrance and exit portions 72 and 74 are a pair of valve bores 76, 78, for housing a similar pair of check valve assemblies 68. In the illustrated embodiment each check valve assembly 68 will be seen to comprise a ball check 80 and a compression spring 82 which normally urges the ball check 80 against a valve seat 84 formed in respective valve bores 76 and 78.

Figures 4, 5:
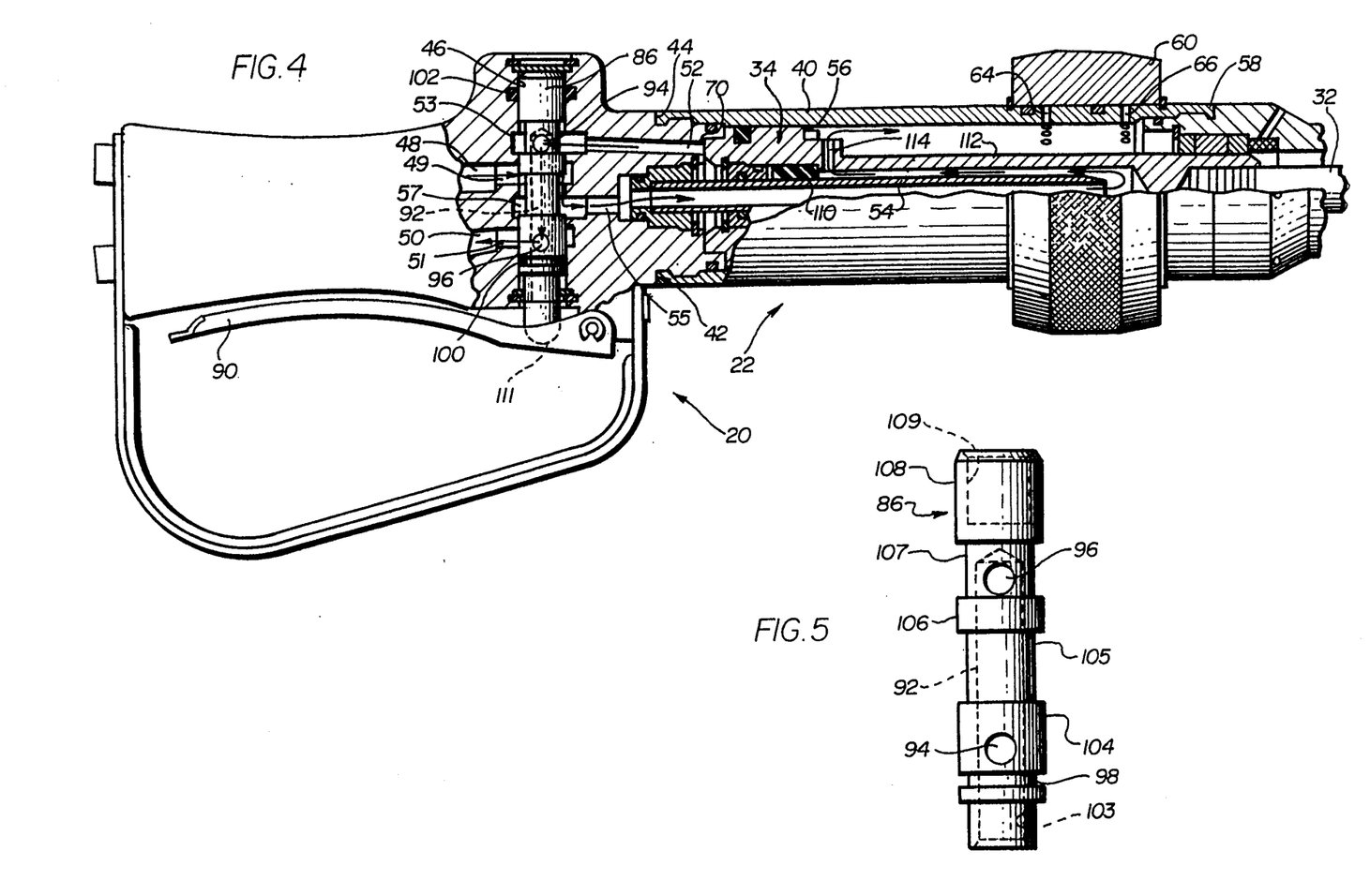
FIG. 4 is a view similar to FIG. 3 showing the tool in an on position.
FIG. 5 is an enlarged view of a valve spool for use with the tool of the invention.

Referring again to FIGS. 1-4 and also to FIG. 5, the valve bore 46 of the valve body 42 mounts an elongate valve spool 86 which is axially moveable in the valve bore 46. The spool is spring-loaded by compression spring 88 for axial movement in response to pivotal motion or squeezing of an operating lever, trigger or handle 90.

FIG. 1 illustrates an off position, in which the piston 34 is fully advanced relative to cylinder 40 and the blades 26, 28 will be fully opened. The valve spool 86 is configured for placing the cross port 52 in communication with the pressure port 48 and for placing the elongated tubular conduit 54 in communication with the return port 50 when the tool is in the off position, that is with the lever 90 not actuated, and the spool 86 pressed axially downwardly by the spring 88, as illustrated in FIGS. 1 and 3, respectively. Conversely, with the handle or lever 90 actuated as shown in FIGS. 2 and 4, the tool is in its on position and the valve spool 86 is pushed axially upwardly, compressing the spring 88. Thus, the valve spool 86 is pushed axially upwardly as viewed in FIGS. 2 and 4 from the position shown in FIGS. 1 and 3, by the action of the lever or handle 90. The spool 86 is configured for placing the cross port 52 in communication with the return port 50 and the elongated tubular conduit 54 in communication with the pressure port 48 when the tool is in the on position. The above-described communications between the ports 48, 50 and 52 and conduit 54 and the resultant fluid flows are illustrated by respective arrows in FIGS. 1-4.

Referring to FIG. 5, the valve spool 86 will be seen to comprise an elongated generally cylindrical body having an internal bore 92 which communicates between a pair of radially extending side entrance ports or openings 94 and 96. The spool includes a first annular groove 98 for receiving sealing means such as an O-ring 100. A similar sealing arrangement comprising an O-ring 102 is provided in an annular groove formed in the valve body 46 adjacent an upper end of the spool 86 as shown in FIGS. 1-4. The first opening or port 94 is formed in an enlarged diameter portion 104 of the spool 86. A second enlarged diameter portion 106 is spaced from the portion 104 by a reduced diameter portion 105 and approximately centered along the length of the spool 86. A third enlarged diameter portion 108 is spaced from the central portion 106 and extends to an opposite end of the spool 86. The spacing between enlarged diameter portions 106 and 108 are such that the opening 96 is located in a reduced diameter portion 107 of the spool therebetween. The spool also includes a relatively shallow bore 109 for receiving one end of the compression spring 88, and a tapped end 103 of bore 92 receives an end plug 111 (see FIGS. 1-4). The end plug 111 preferably has a radiused end for sliding engagement with lever or handle 90.

Cooperatively with the configuration and dimensions of the spool 86 as shown in FIG. 5, the location of the respective ports 48, 50, 52 and 55 and enlarged diameter valve bore portions 49, 51, 53 and 57, in the valve body, are such as to achieve the foregoing interconnections between respective conduits when the valve is in the on and off positions, as described hereinabove. It is noted that in the on position as illustrated respectively in FIGS. 2 and 4, that the central bore 92 of the spool 86 completes the communication between the cross bore 52 and return bore 50.

In the illustrated embodiment, the elongate tubular conduit 54 extends interiorly of the cylinder 40 and is approximately centered therein. Cooperatively, the piston 34 has a through aperture 110, preferably centered therethrough, for slidably receiving the tubular conduit 54 therethrough as the piston reciprocates between its fully advanced position as shown in FIGS. 1 and 3 and its fully retracted position as shown in FIGS. 2 and 4. In this regard, and referring also to FIG. 6, the piston 34 includes an elongated extension 112 which projects from the through aperture 110 for surroundingly receiving the elongate tubular conduit 54 as the piston 34 moves from its fully advanced position as illustrated in FIGS. 1 and 3 to its fully retracted position as illustrated in FIGS. 2 and 4. In order to permit communication between the tubular conduit 54 and the opposite side 56 of the piston 34, the piston 34 is provided with openings 114 communicating between its through aperture 110 and the side 56 of the piston 34.

Figure 6:
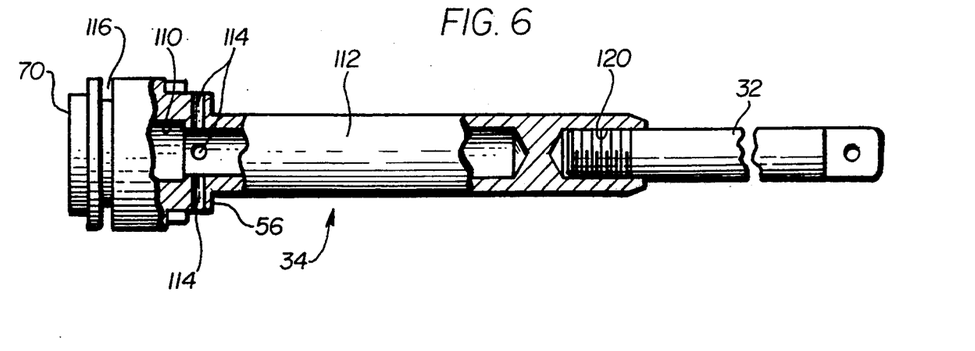
FIG. 6 is an enlarged view of a piston and linkage of the illustrated embodiment.

The extension 112 threadably receives one end of the elongate linkage 32. An annular groove 116 in the piston mounts a square section seal member 118 for sealing, slidable engagement with the interior of the cylinder 40. A tapped thread 120 at the closed end of extension 112 receives the linkage 32.

Having thus described the construction of the hydraulic control system or apparatus of the invention, the operation thereof in both open center and closed center modes will be described with reference to FIGS. 1–4 of the drawings.

Referring first to FIG. 1, for open center operation, with the trigger or lever 90 in an off or neutral position, the piston 34 is initially in its fully advanced position. The hydraulic power source or pump which operates the tool is a constant volume system, such that there is a steady flow of oil to be returned back to the pump supply. The selector sleeve 60 is turned to its "open center" position (FIGS. 1 and 2) so that the through openings 64, 66 and the cylinder align with opposite ends of the passage 62 in the selector 60. The hydraulic fluid enters the pressure port 48 and flows around the decreased diameter portion 107 of the spool 86 to the cross connect bore 52. From the cross port 52, the fluid flows into the cylinder 40 to push the piston 34 to its fully advanced position. The piston is balanced in this position by the fluid flow between the apertures 64 and 66. The respective check valves 68 will be opened slightly in this regard. Return flow to the return port 50 is had by way of opening 114, through aperture 110 and elongate conduit 54, which connects through valve port 55 to increased diameter portion 57. The increased diameter area 57 surrounds reduced diameter portion 105 of the valve spool 86, which also extends so as to be in communication with increased diameter portion 51 which communicates with return port 50.

Referring next to FIG. 2, for open center operation the trigger or lever 90 is actuated or in the on position, in order to fully retract the piston 34. Depressing the lever or trigger 90 causes an axial shift in the valve spool 86 to compress spring 88. This shift is such that the decreased diameter portion 105 of the spool 86 communicates between the pressure port 48 and the port 55 leading to the conduit 54. Accordingly, the hydraulic fluid flows from the pressure port 48 through the conduit 54 and aperture 114 to the opposite side 56 of the piston 34. The check valve 68 will remain closed due to the pressurized fluid holding the valve balls 80 against their respective seats 84. At the same time, the cylinder 40 communicates by way of cross port 52 and enlarged area 53 with the decreased diameter portion 107 and its opening or aperture 96 in the spool 86. Thus, fluid flows through aperture 96 and internal bore 92 and out aperture 94 of the spool 86, the aperture 94 being in communication with the increased diameter area 51 and return port 50. Thus, the fluid is free to flow from the cylinder 40 to the return port 50, such that the fluid from pressure port directed to the opposite side 56 of the piston 34 can return the piston to its fully retracted position as illustrated in FIG. 2.

Referring next to FIG. 3, in a closed center mode of operation, the power source is a constant pressure system which pumps fluid only upon demand, such that the hydraulic fluid in the tool is under some predetermined pressure. In the neutral or off position shown in FIG. 3, there is no pump flow and no fluid flowing back to the supply. The selector or sleeve 60 is rotated so that the ports 62 and 64 of the cylinder 40 are no longer in communication with each other. The flow of fluid relative to the valve bore 46 and valve spool 86 is the same as that described above with reference to FIG. 1. Thus, fluid flows from the pressure port 48 to the cylinder 40 by way of cross port 52, thus driving and maintaining the piston 34 in its fully advanced position. The opposite side of 56 of the piston 34 is in communication through opening 114, opening 110 and conduit 54 with return port 50, such that any fluid on this side of the piston may be returned through return port 50 as the piston 34 is advanced from its retracted position toward the advanced position shown in FIG. 3.

Referring to FIG. 4, with the trigger or lever 90 depressed, the spool 86 shifts relative to the valve bore 46 to assume the same position and interconnect the respective ports 48, 50, 52 and 55 in the same fashion as described above with reference to FIG. 2. Accordingly, the hydraulic fluid flows from pressure port 48 to conduit 54 and to the back side 56 of the piston 34. The cylinder 40 is coupled with the return port 50 by way of cross port 52, openings 94 and 96 and central bore 92 of the valve spool 86. This allows return flow from the cylinder 40 as the piston 34 is being pushed back by the fluid pressure on its back side or opposite side 56 toward the fully retracted position shown in FIG. 4.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. For example, while the invention has been disclosed with respect to a reciprocating type tool, it is envisioned that the invention may be used with tools employing other types of hydraulic operation. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

The invention is claimed as follows:

1. A hydraulic control apparatus for use with a hydraulic tool, said apparatus comprising: a valve body operatively coupled to said hydraulic tool and having a valve bore defining an axis, said valve body also defining a pressure port and a return port for connecting said valve bore to a source of hydraulic fluid, and a cross port communicating between said valve bore and said hydraulic tool; a tubular conduit having one end in communication with said valve bore and an opposite end in communication with said hydraulic tool; and a selector member moveable between a first position for defining a passage communicating between said cross port and said opposite end of said tubular conduit to define a return path for hydraulic fluid between said pressure port and said return port, and a second position for closing off said passage, said passage defined by said selector member having a check valve for permitting fluid flow only in a direction from said cross port to said opposite end of said tubular conduit.

2. A hydraulic control apparatus for use with a hydraulic tool, said apparatus comprising: a valve body operatively coupled to said hydraulic tool and having a valve bore defining an axis, said valve body also defining a pressure port and a return port for connecting said valve bore to a source of hydraulic fluid, and a cross port communicating between said valve bore and said hydraulic tool; a tubular conduit having one end in communication with said valve bore and an opposite end in communication with said hydraulic tool; and a selector member moveable between a first position for defining a passage communicating between said cross port and said Opposite end of said tubular conduit to define a return path for hydraulic fluid between said pressure port and said return port, and a second position for closing off said passage, said selector including an annular sleeve having said passage formed therein, and rotatably mounted to an external surface of said hydraulic tool, said sleeve being rotatable relative to said hydraulic tool for placing said passage into and out of communication with said cross port and said opposite end of said tubular conduit.

3. A hydraulic control apparatus for use with a hydraulic tool, said apparatus comprising: a valve body operatively coupled to said hydraulic tool and having a valve bore defining an axis, said valve body also defining a pressure port and a return port for connecting said valve bore to a source of hydraulic fluid, and a cross port communicating between said valve bore and said hydraulic tool; a tubular conduit having one end in communication with said valve bore and an opposite end in communication with said hydraulic tool; and a selector member moveable between a first position for defining a passage communicating between said cross port and said opposite end of said tubular conduit to define a return path for hydraulic fluid between said pressure port and said return port, and a second position for closing off said passage, said selector including an annular sleeve having said passage formed therein, and rotatably mounted to an external surface of said hydraulic tool, wherein said external surface of said hydraulic tool has at least one pair of through openings respectively located for alignment with opposite sides of said passage when said sleeve is in said first position, said through openings communicating with said cross port and with said opposite end of said tubular conduit, respectively; and said sleeve being rotatable relative to said cylinder between said first position and said second position for placing said passage into and out of communication with said through openings, respectively.

4. A hydraulic control apparatus for use with a reciprocating hydraulically operated tool, said apparatus comprising: an elongated cylinder; a piston mounted for reciprocal motion between opposite ends of said elongated cylinder; a valve body operatively coupled to one end of said elongated cylinder and having a valve bore defining an axis, said valve body also defining a pressure port and a return port for connecting said valve bore to a source of hydraulic fluid, and a cross port communicating between said valve bore and said elongated cylinder; an elongated tubular conduit having one end in communication with said valve bore and an opposite end in communication with a side of said piston facing opposite said one end of said cylinder; and a selector member moveable between a first position for defining a passage communicating between opposite sides of said piston when said piston is fully advanced with respect to said cylinder in a direction opposite said one end of said cylinder, and a second position for closing off said passage.

5. Apparatus according to claim 4 and further including a valve spool axially movable in said valve bore between an on position and an off position, said valve spool being configured for placing said cross port in communication with said pressure port when in said off position and for placing said cross port in communication with said return port when in said on position.

6. Apparatus according to claim 5 wherein said valve spool is further configured for placing said elongated tubular conduit in communication with said pressure port when in the on position and for placing said elongated tubular conduit in communication with said return port when in said off position.

7. Apparatus according to claim 4 wherein said passage defined by said selector member has a check valve for permitting fluid flow only in a direction from a side of a piston facing said one end of the cylinder to the side of said piston facing opposite said one end of said cylinder.

8. Apparatus according to claim 4 wherein said selector is rotatably mounted to an external surface of said cylinder, and wherein said cylinder has at least one pair of through openings respectively located for alignment with opposite sides of said piston member when said piston member is fully advanced, said through openings communicating with said passage defined by said selector member, and said selector member being rotatable relative to said cylinder for placing said passage into and out of communication with said through apertures.

9. Apparatus according to claim 4 wherein said elongated tubular conduit extends interiorly of said cylinder and wherein said piston includes a through aperture for slidably receiving said elongated tubular conduit therethrough.

10. Apparatus according to claim 9 wherein said piston further includes an elongated extension projecting from said through aperture for surroundingly receiving said elongated tubular conduit as said piston moves from said fully advanced position to a fully retracted position wherein said piston is located adjacent said valve body at said one end of said cylinder.

11. Apparatus according to claim 10 wherein said piston further includes an opening communicating between said through aperture and the side of said piston facing opposite said one end of said cylinder.

12. Apparatus according to claim 7 wherein said selector is rotatably mounted to an external surface of said cylinder, and wherein said cylinder has at least one pair of through openings respectively located for alignment with opposite sides of said piston member when said piston member is fully advanced, said through openings communicating with said passage to either side of said check valve, and said selector member being rotatable relative to said cylinder for placing said passage into and out of communication with said through apertures.

* * * * *